(12) United States Patent
Yau (10) Patent No.: US 9,565,485 B2
(45) Date of Patent: Feb. 7, 2017

(54) AUDIO INFORMATION SIGNAL SUPPORTING INTERACTIVE INTERCONNECTED SYSTEM

(71) Applicant: Yimwai Yau, Hong Kong (CN)

(72) Inventor: Yimwai Yau, Hong Kong (CN)

(73) Assignee: Yimwai Yau (CN)

( * ) Notice: Subject to any disclaimer, the term of this patent is extended or adjusted under 35 U.S.C. 154(b) by 0 days.

(21) Appl. No.: 14/772,772

(22) PCT Filed: Mar. 4, 2014

(86) PCT No.: PCT/CN2014/072771
§ 371 (c)(1),
(2) Date: Dec. 6, 2015

(87) PCT Pub. No.: WO2014/135037
PCT Pub. Date: Sep. 12, 2014

(65) Prior Publication Data
US 2016/0127805 A1    May 5, 2016

(30) Foreign Application Priority Data

Mar. 4, 2013 (CN) .......................... 2013 2 0099660
Mar. 4, 2013 (CN) .......................... 2013 2 0099685
(Continued)

(51) Int. Cl.
*H04N 21/235* (2011.01)
*H04N 21/858* (2011.01)
(Continued)

(52) U.S. Cl.
CPC ........ *H04N 21/858* (2013.01); *H04N 21/4126* (2013.01); *H04N 21/41407* (2013.01);
(Continued)

(58) Field of Classification Search
CPC combination set(s) only.
See application file for complete search history.

(56) References Cited

U.S. PATENT DOCUMENTS

| 8,799,005 B2 * | 8/2014 | Pantaliano | G06Q 30/02 |
| | | | 705/1.1 |
| 2013/0080348 A1 * | 3/2013 | Pantaliano | G06Q 30/02 |
| | | | 705/347 |

* cited by examiner

*Primary Examiner* — Kieu Oanh T Bui
(74) *Attorney, Agent, or Firm* — PROI Intellectual Property US (57) ABSTRACT

The invention relates to an information association technology supporting a cross-media product, in particular to an audio information signal supporting an interactive interconnected system. The signal is formed by audio data and associated data synthesis. The interactive interconnected system comprises an electronic reading device and an electronic transmitter-receiver. The associated data is a preset Uniform Resource Identifier. The electronic transmitter-receiver is provided with an associated data reception circuit, an associated data transmission circuit and a central processing unit (with memory). The associated data reception circuit is equipped with a short-distance signal transmission-reception circuit. The electronic transmitter-receiver is mainly configured to control transmit-receive of the associated data of a decomposed multimedia information signal, receive the associated data decomposed by a transmission circuit of the electronic reading device, transmit the associated data to an external information data storage center via a remote wireless technology, and quickly call out an associated electronic file.

13 Claims, 5 Drawing Sheets

(30) Foreign Application Priority Data

Oct. 8, 2013 (CN) .......................... 2013 2 0626574
Jan. 4, 2014 (CN) .......................... 2014 2 0028354

(51) Int. Cl.
*H04N 21/4363* (2011.01)
*H04N 21/439* (2011.01)
*H04N 21/41* (2011.01)
*H04N 21/414* (2011.01)
*H04N 21/426* (2011.01)
*H04N 21/434* (2011.01)
*H04N 21/81* (2011.01)

(52) U.S. Cl.
CPC ..... *H04N 21/42653* (2013.01); *H04N 21/439* (2013.01); *H04N 21/4349* (2013.01); *H04N 21/43637* (2013.01); *H04N 21/812* (2013.01)

AUDIO INFORMATION SIGNAL SUPPORTING INTERACTIVE INTERCONNECTED SYSTEM

CROSS REFERENCE TO RELATED APPLICATIONS

The present application is the US national stage of International Patent Application PCT/CN2014/072771 filed on Mar. 4, 2014, which, in turn, claims priority to Chinese Patent Applications CN 201320099685.0 filed on Mar. 4, 2013, CN 201320099660.0 filed on Mar. 4, 2013, CN 201320626574.0 filed on Oct. 8, 2013, and CN 201420028354.2 filed on Jan. 4, 2014.

TECHNICAL FIELD

The invention relates to an information association technology supporting a cross-media product, in particular to an audio information signal supporting an interactive interconnected system for achieving barrier-free development of information.

BACKGROUND ART

With the rapid development of a broadband wireless access technology and a mobile terminal technology, people have an urgent hope to be able to obtain information and service from Internet conveniently at will in a mobile process whenever and wherever possible.

However, mobile Internet is not mobilized Internet, but is a generic term of activities of combination and practice of technologies, platforms, commercial modes and applications of the Internet, and mobile communication technologies.

Mobile terminals will be more networked and socialized in future. How will the boring fragmented time of the people be made full use of? Such boring fragmented time is isolated and short. Since a mobile phone and other intelligent terminals are closest to the people, they can be considered as a constituent part of the people.

As the mobile phone becomes a mobile carrier in an information network, the mobile phone is not just a tool for making a call and sending short messages any longer, but is a miniature computer which can achieve ultimate combination of communication and the Internet to enable people to enter the era of mobile informatization really.

The mobile informatization is to realize comprehensive application of an information system on a handheld terminal such as the mobile phone in a manner of fusion of communication technologies such as telecommunications, broadcast and the Internet to achieve the purpose of obtaining relevant information whenever and wherever possible at will at last.

Although the transmission capacity of a traditional media advertisement product is lower than that of electronic media obviously, electronic media are not an "ultimate media form which can replace any one of the traditional print paper media, traditional broadcast, traditional television, traditional Internet and the like" praised highly by some people. How do matters stand?

The development of the electronic media still has serious defects and deficiencies. Due to the lack of relevant technical support for achieving cross-media information interaction association, so-called omni-media is just to prepare the information content of the plane media into an electronic edition to be provided for a user to select.

With the development of a new generation broadcast technology based on DAB (Digital Audio Broadcasting), DVB (Digital Video Broadcasting), DMB (Digital Media Broadcasting) and the like, scientific and technical workers all over the world try hard to solve the relevant problems, for example Chinese invention patents 200310113194.8, 200610072903.6, 200580034624.4, 200620039633.4 and the like, which only effectively improve the transmission capacity of the information.

The smart phone shall log in the relevant electronic Internet of the cross-media product information to obtain richer relevant information epitaxially, the association technology is a non-spanning necessity, and the association technology and a transmission technology are two technical purposes of different concepts.

The existing association technology on the market is mainly a QR code pattern technical scheme. Although the QR code pattern technical scheme has become a mature product and industrial chain, there are many technical use condition limits in actual operation, as follows:

1. The smart phone can carry out capturing after downloading an appropriate application.
2. Definition of a QR code pattern.
3. Light during capturing of the QR code pattern.
4. Distance for capturing of the QR code pattern.
5. The QR code patterns are different in size (including 8 mm*8 mm, 10 mm*10 mm ... 100 mm*100 mm, etc.), and the attached QR code patterns influence the appearance attractiveness of an advertisement board.

If the QR code patterns are implanted into a screen frame and a webpage of a video product ... during the actual operation, an electronic screen displays the QR code patterns for a very short time, and the user operation is difficult.

In addition, the QR code pattern technical scheme is powerless to achieve broadcast (an audio information technology) association with the audio information signal . . . .

Therefore, a simpler and quicker interaction association technology with a high effect for randomly meeting the requirements anytime and anywhere is an urgent hope for the market.

The interactive interconnected system provided by the invention is a technology for achieving barrier-free transmission of the cross-media product information.

SUMMARY

In order to achieve the above purposes, the invention provides an audio information signal supporting an interactive interconnected system. The audio information signal is formed by audio data and associated data synthesis and is characterized in that the interactive interconnected system comprises an electronic reading device and an electronic transmitter-receiver;

the associated data is a preset URI (Uniform Resource Identifier);

the electronic reading device is provided with a combination data reception circuit, a combination data decomposition circuit and a transmission circuit; the combination data reception circuit is configured to receive the audio information signal; the combination data decomposition circuit is configured to decompose the audio information signal into media information data and the associated data; the decomposed associated data is transmitted to the electronic transmitter-receiver via the transmission circuit;

the electronic transmitter-receiver is provided with an associated data reception circuit, an associated data transmission circuit and a central processing unit (with memory);

the associated data reception circuit is equipped with a short-distance signal transmission-reception circuit; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

The URI (Uniform Resource Identifier) is one supporting Internet connection.

The URI (Uniform Resource Identifier) is communication data supporting telecommunication network connection.

The associated data is an associated data group as a combination of more than one associated data, and the different URIs (Uniform Resource Identifiers) are set for the different associated data respectively.

The associated data sets an electronic reading code, the different electronic reading codes correspond to the different associated data, and the different URIs (Uniform Resource Identifiers) are set for the different associated data respectively.

Multiple replication and cyclic transmission are set for the associated data within reading time of the media information data.

The association address data is association hybrid data capable of being mixed with content data such as characters, images, audio and video, and the association hybrid data is decomposed into the associated data by an association hybrid data decomposition circuit.

The audio information signal is transmitted by a signal transmission station and a signal transmission transfer device.

The transmission circuit of the electronic reading device is equipped with the short-distance signal transmission-reception circuit;

the combination data decomposition circuit of the electronic reading device is configured to decompose the audio information signal into the audio data and the associated data;

The audio data after the decomposition of the media information data is transmitted to the related configuration for use after transmitted to an audio system for processing; and the decomposed associated data is transmitted by the transmission circuit and the equipped short-distance signal transmission-reception circuit.

The audio information signal is stored in an electronic storage device, and read by an audio terminal product supporting the interactive interconnected system.

The media information data and the associated data employ an encrypted synthesis method.

The invention provides an audio information signal supporting the interactive interconnected system, which realizes the interaction association of cross-media information products and achieves the goal of barrier-free information:

1. The audio information signal is provided to different related products supporting the interactive interconnected system, and the related associated data is decomposed by the electronic reading device, and transmitted synchronously as a quick entry point of an electronic webpage to meet random technical requirements of the mobile informatization anytime and anywhere.

2. Due to the technical combination characteristic of the interactive interconnected system, original functions of the product are not changed, and combined functions can support mutually to achieve an obvious technical effect, the barrier-free association of the cross-media product information is achieved by the simplest point-to-point association technology, and the interaction association capacity of the interactive interconnected system is obviously better than that of the existing QR code and other association technology solutions on the market.

The invention has the particular contribution that the associated data can be transmitted by taking various approaches, so that the invention solves the technical problem of information congestion in the mobile informatization development effectively, and assists in improving the existing traffic light facility by using the existing social resources of advertisement boards in bus shelters, and visually impaired people obtain help of voice guide and relevant traffic information service via communication terminal products (such as a smart phone) supporting the interactive interconnected system.

DETAILED DESCRIPTION OF PREFERRED EMBODIMENTS

Figure 1A:
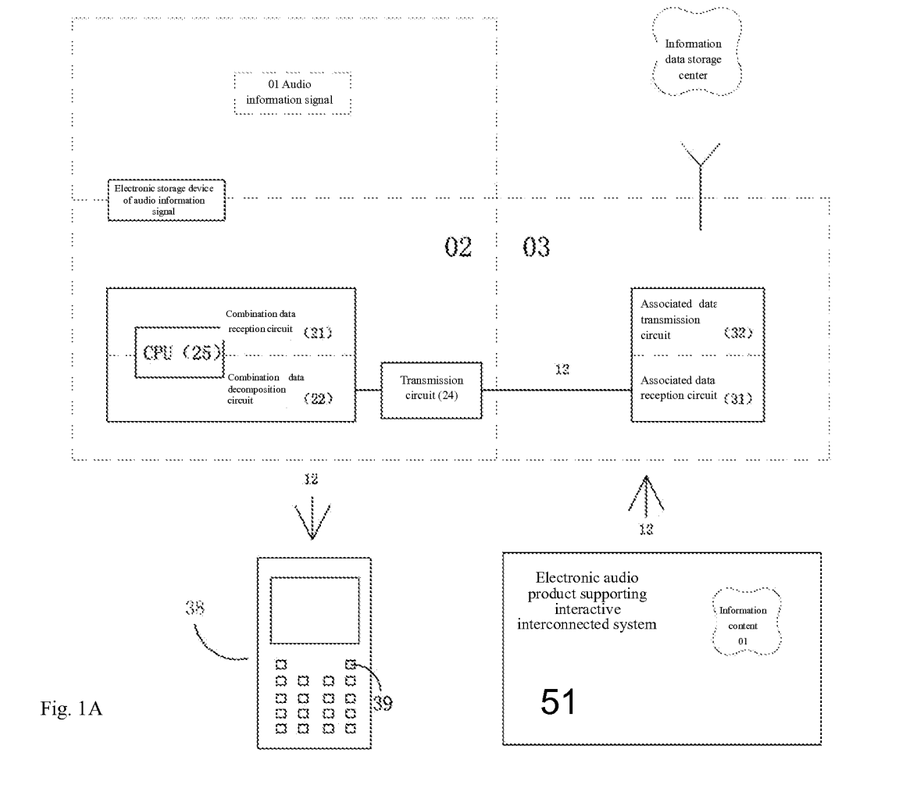
FIG. 1A is an operation diagram of an electronic audio product to obtain single associated data.

The following embodiments further explain and describe the invention, and do not constitute any limit to the invention;

The invention provides an audio information signal supporting an interactive interconnected system. The audio information signal 01 is formed by audio data 11 and associated data 12 synthesis and is characterized in that the interactive interconnected system comprises an electronic reading device 02 and an electronic transmitter-receiver 03;

the associated data is a preset URI (Uniform Resource Identifier);

as shown in FIG. 1A, the electronic reading device is provided with a combination data reception circuit 21, a combination data decomposition circuit 22 and a transmission circuit 24; the combination data reception circuit is configured to receive the audio information signal; the combination data decomposition circuit 22 is configured to decompose the audio information signal into media information data and the associated data; the decomposed associated data is transmitted to the electronic transmitter-receiver via the transmission circuit 24;

the electronic transmitter-receiver is provided with an associated data reception circuit 31, an associated data transmission circuit 32 and a central processing unit (with memory);

the associated data reception circuit 31 is equipped with a short-distance signal transmission-reception circuit;

the short-distance communication technology includes NFC and Bluetooth technology, etc.; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

The remote communication technology includes GSM (Global System for Mobile), CDMA (Code Division Multiple Access), GPRS (General Packet Radio Service) and other technologies.

The external information data storage center may be a memory of a related product, Internet, cloud storage and the like, or a built-in memory of the electronic reading device.

The called electronic file is viewed by a visual electronic screen product, including an electronic terminal product, a communication terminal product, a computer, the electronic audio product and the like supporting an interaction association technology.

The URI (Uniform Resource Identifier) is one supporting Internet connection.

The URI (Uniform Resource Identifier) is communication data supporting telecommunication network connection.

Figure 1B:
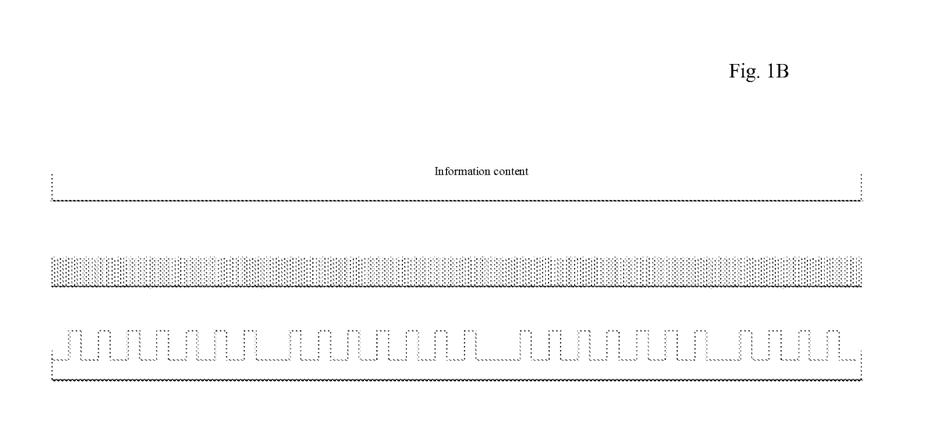
FIG. 1B is a principle diagram of an electronic audio product to obtain single associated data.

As shown in FIG. 1B, one single information content is shown, only one single associated data (namely a single URI (Uniform Resource Identifier)) is required to be set for the information content, and multiple replication and cyclic transmission are set for the associated data within reading time of a media information content.

Figure 1C:
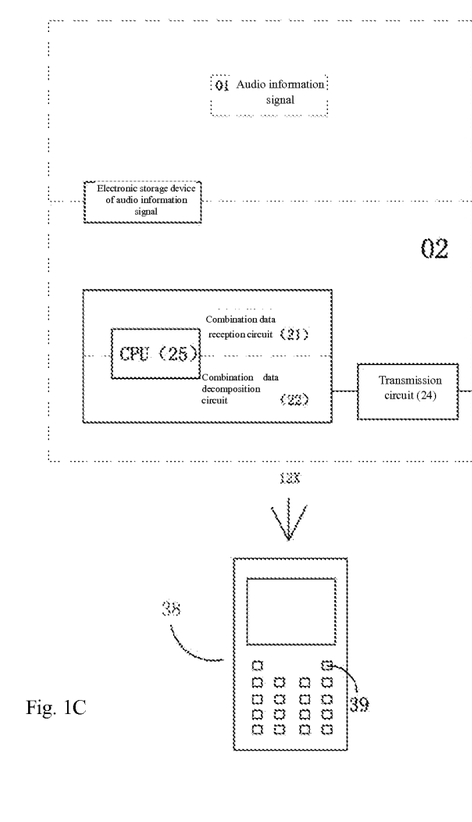
FIG. 1C is an operation diagram of an electronic audio product to obtain multiple associated data.

As shown in FIG. 1C,

The associated data is an associated data group 12X as a combination of more than one associated data, and the different URIs (Uniform Resource Identifiers) are set for the different associated data respectively.

Figure 1D:
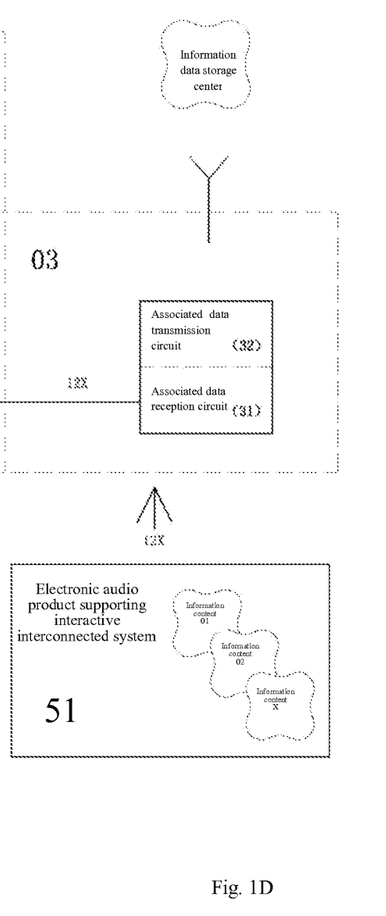
FIG. 1D is a principle diagram of an electronic audio product to obtain multiple associated data.

As shown in FIG. 1D, six information contents are shown, and correspond to the six associated data (namely the six URIs (Uniform Resource Identifiers)), and the different URIs (Uniform Resource Identifiers) are associated with different electronic files . . . .

The URI (Uniform Resource Identifier) T01 corresponds to the information content 01 . . . .

The URI (Uniform Resource Identifier) T05 corresponds to the information content 05 . . . .

The URI (Uniform Resource Identifier) TX corresponds to the information content X . . . .

The multiple replication and cyclic transmission are set for the different associated data within the reading time of the six different media information contents.

The associated data sets an electronic reading code 14, the different electronic reading codes correspond to the different associated data, and the different URIs (Uniform Resource Identifiers) are set for the different associated data respectively.

The application of the existing technical scheme on the market is as follows.

Figure 3A:
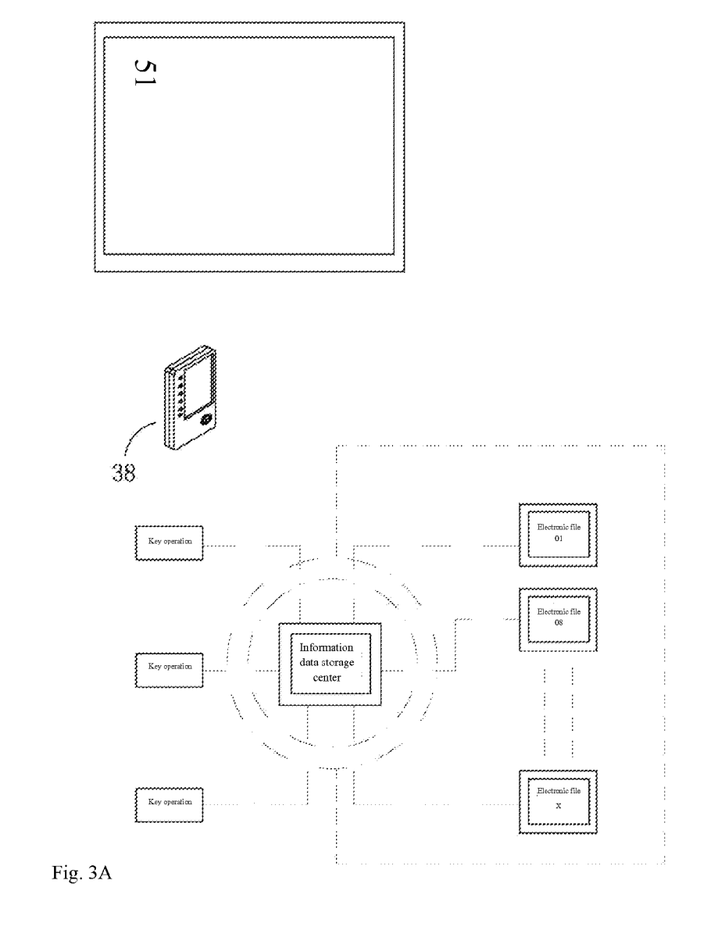
FIG. 3A is a schematic diagram of an interaction association method of a traditional electronic audio product.

As shown in FIG. 3A, the electronic audio product 51 plays an audio content, and a smart phone can only obtain relevant audio content data of the electronic audio product 51 with a traditional downloading method.

For example, the electronic audio product plays an audio program which introduces various contents; in order to allow a user to log in a website (or a service center) of the relevant contents for more detailed information search, or further learn the relevant contents by making a call via the smart phone conveniently, the audio program makes a sound for prompting the relevant website or a phone number . . . . Since the information prompt is instant, 1. Most audiences are too late to mark down.
2. Visually impaired people are very difficult to carry out relevant operations.

In order to improve the impact of the traditional media, there're various technical association solutions on the market. One technical association solution is a QR code technical solution. However, the QR code pattern technical scheme is powerless to achieve broadcast (an audio information technology) association with the audio information signal . . . .

Figure 4A:
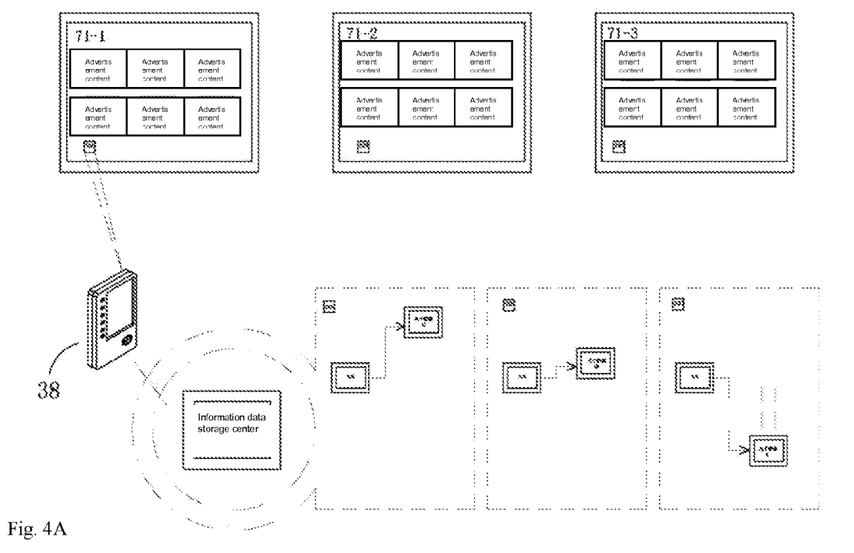
FIG. 4A is a design sketch of a traditional electronic advertisement board with an implanted QR code technology.

As shown in FIG. 4A, the QR code patterns have been implanted into three LED (Light Emitting Diode) boards of a station respectively (the planar information technology) to allow waiters to see the concerned advertisement contents;

1. The QR code pattern is captured by the smart phone and processed and converted into the URI (Uniform Resource Identifier) . . . .
2. Access to the website of the relevant URI (Uniform Resource Identifier) . . . .
3. Different series operating times shall be repeated for the different QR code patterns . . . .

It shall be especially emphasized that the operation will be very complicated if the QR code patterns attached to the three LED boards of the station are not associated with the information from the same electronic website.

The user shall capture the QR code patterns within a short time, which is a technical challenge.

The relevant embodiments of the invention are as follows.

First Mode:

The electronic reading device is provided with the combination data reception circuit, the combination data decomposition circuit, the transmission circuit, and a CPU (Central Processing Unit) module board, which are embedded into the electronic audio product supporting the interactive interconnected system; and the electronic transmitter-receiver is provided with an associated data reception circuit, an associated data transmission circuit and a central processing unit (with memory), which are embedded into a communication terminal product of the interactive interconnected system.

Due to the technical combination characteristic of the interactive interconnected system, original functions of the product are not changed, and combined functions can support mutually to achieve an obvious technical effect, and the barrier-free information connection of the cross-media product can be achieved by the simplest point-to-point association technology.

There are two operating methods for obtaining the associated data basically:

first method: on the smart phone (within an effective range), an association operation key 39 is pressed at will (to start the interactive interconnected system), and then the association operation key 39 is pressed again, so that the electronic transmitter-receiver can obtain the selected associated data (namely the URI (Uniform Resource Identifier)) from the electronic reading device;

second method: on the smart phone (within an effective range), the association operation key 39 is pressed at will (to start the interactive interconnected system), and then a corresponding figure (the electronic reading code) according to a figure implanted into the information content (a planar identification mark) is input, so that the electronic transmitter-receiver can obtain the selected associated data (namely the URI (Uniform Resource Identifier)) from the electronic reading device . . . .

Another use method is as follows: the user presses an enter key after accomplishing relevant steps of the first method or the second method, and the electronic transmitter-receiver can obtain the selected associated data from the electronic reading device for storage.

Afterwards, the set associated electronic file can be called out quickly anytime, and the associated data can be transmitted to the data storage center via the transmission circuit to quickly call out the set associated electronic file for viewing (or listening) on the smart phone.

Second Mode:

The combination data reception circuit, the combination data decomposition circuit, the transmission circuit and a CPU module of the electronic reading device, as well as the associated data reception circuit, the associated data transmission circuit and the central processing unit module (comprising the memory) of the electronic transmitter-receiver are embedded into the electronic audio product supporting the interactive interconnected system.

Figure 2A:
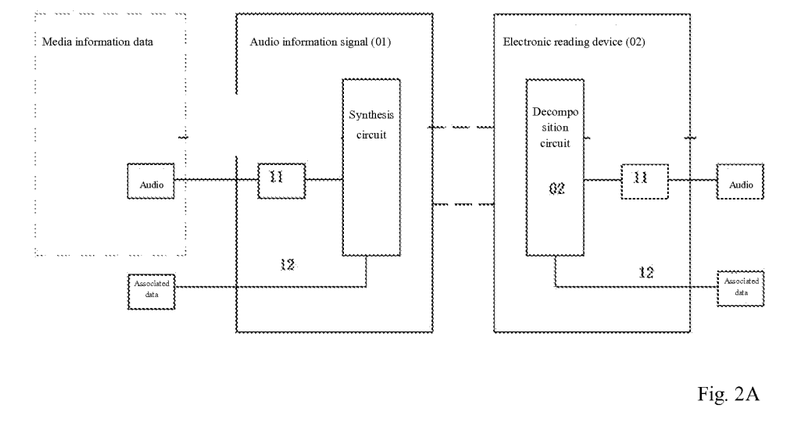
FIG. 2A is a principle diagram of an audio information signal supporting an interactive interconnected system.
Figure 2B:
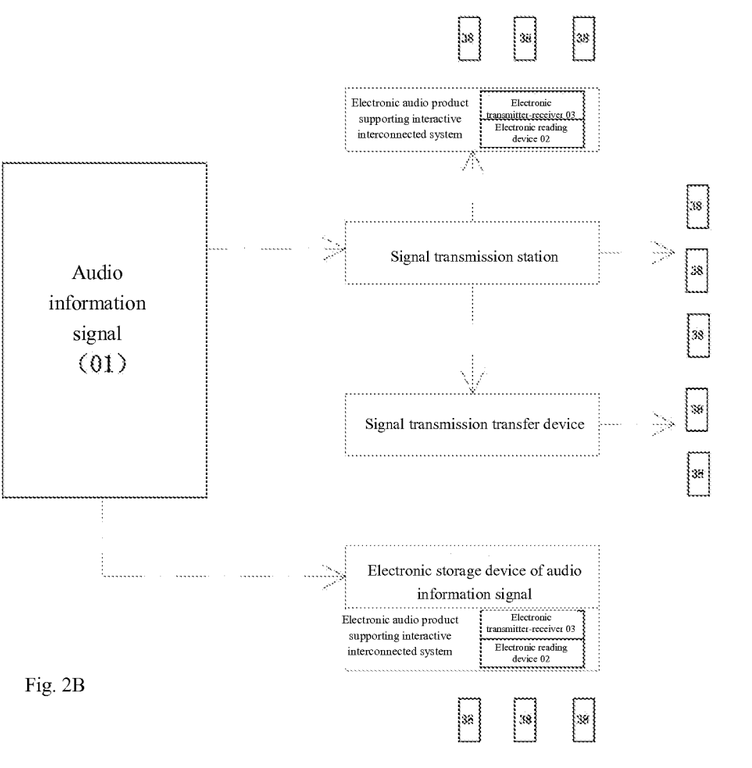
FIG. 2B is a schematic diagram of a technical application of an interactive interconnected system.

As shown in FIGS. 1A, 1C and 2B, the user receives the associated data from the plane media product supporting the interactive interconnected system via the communication terminal product (such as the smart phone) under the guidance (simple sound and light guidance) of the media information content of the plane media product, and then transmits the associated data synchronously to achieve a point-to-point effect.

It shall be especially emphasized that the mode can provide more conveniences for the visually impaired people and the hearing impaired people to use public facilities.

As shown in FIG. 2B,

The audio information signal is transmitted by a signal transmission station and a signal transmission transfer device.

As shown in FIG. 2A, the transmission circuit of the electronic reading device is equipped with the short-distance signal transmission-reception circuit;

the combination data decomposition circuit of the electronic reading device is configured to decompose the audio information signal into the audio data 11;

The audio data after the decomposition of the media information data is transmitted to the related configuration for use after transmitted to an audio system for processing; and the decomposed associated data is transmitted by the transmission circuit and the equipped short-distance signal transmission-reception circuit.

The electronic transmitter-receiver is provided with the association operation key 39, a signal induction device 36 supporting the interactive interconnected system, and an electronic display screen.

The multiple replication and cyclic transmission are set for the associated data within the reading time of the media information data, the user is only required to press the association operation key 39, and the electronic transmitter-receiver is configured to receive the associated data decomposed by the transmission circuit of the electronic reading device, transmit the associated data to the external information data storage center via the remote wireless technology, and quickly call out the associated electronic file associated with the information data storage center.

Since many information signals exist in an atmosphere, the communication terminal product supporting the interactive interconnected system is provided with the signal induction device 36 (including light, sound and the like) to remind the user that the relevant associated data of the interactive interconnected system can be provided for a position range where the user is located . . . which particularly meets the requirements of the visually impaired people.

The association address data is association hybrid data 12M capable of being mixed with content data such as characters, images, audio and video, the association hybrid data 12M is decomposed into the associated data by an association hybrid data decomposition circuit, and the user can carry out selective operation according to the requirements via guide information such as the relevant characters, images, audio and video displayed on the electronic display screen of the electronic transmitter-receiver.

Embodiment 1

Figure 3B:
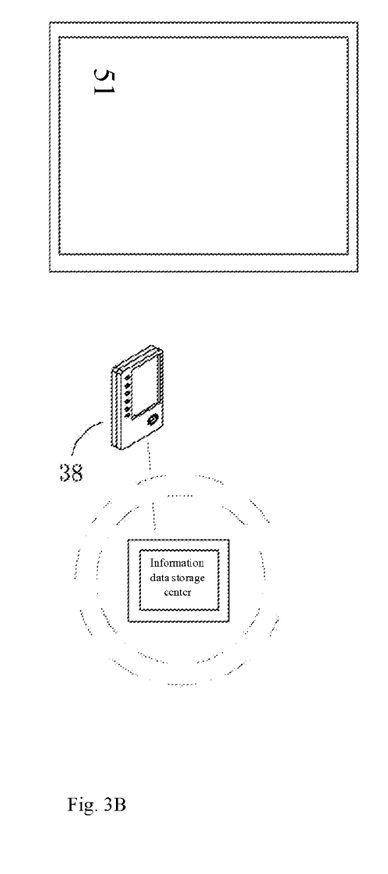
FIG. 3B is a design sketch of an electronic audio product supporting an interactive interconnected system and adopting the invention.

As shown in FIG. 3B, the communication terminal product 38 is matched with the audio information signal for use, and the associated data can be obtained very easily with the first or second method . . . .

Obviously, the visually impaired people also carry out operations and use easily.

Embodiment 2

Another important value of the invention is to support the barrier-free development of the information and utilize the existing advertisement board resources of the bus shelters in society:

1. Braille characters and braille icons are attached to the plane advertisement boards of the station for guidance.

2. Prompts supporting the interactive interconnected system are provided on the plane advertisement boards of the station to allow the visually impaired people to obtain the relevant traffic information and service from the smart phone supporting the interactive interconnected system.

Figure 4B:
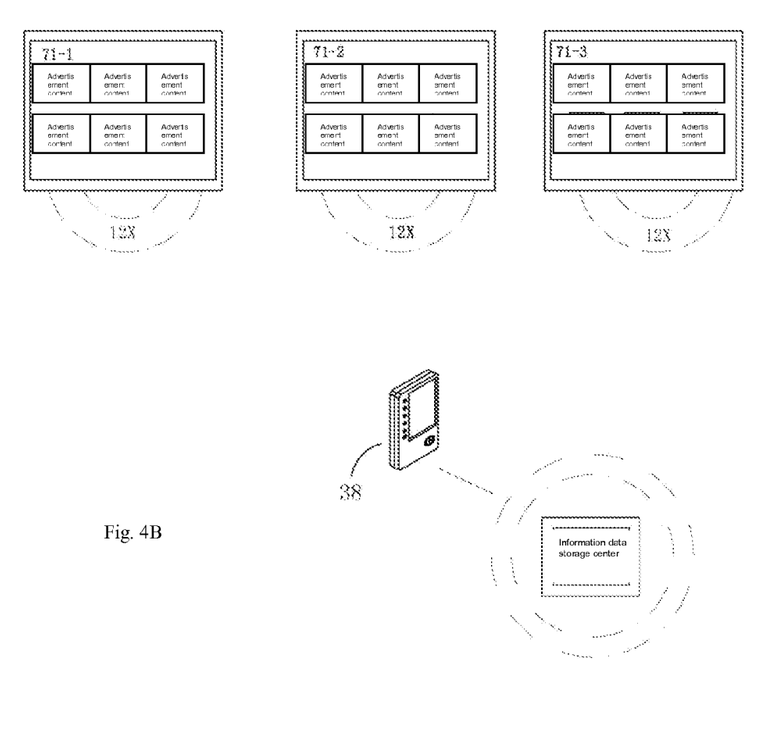
FIG. 4B is an application effect diagram of an electronic advertisement board supporting an interactive interconnected system.

As shown in FIG. 4B, the three LED boards of the station adopts the technology of the invention, the figures are implanted into advertisement contents of the LED boards, and the LED boards provide the relevant associated data (simple voice prompt) supporting the interactive interconnected system. Therefore, even the visually impaired people can carry out operations and use.

Embodiment 3

The blind are the weakest group in the disabled; in order to allow the blind to participate in the social life equally, it is required to raise the education level of them; although we cannot give a pair of eyes for the blind to see the outside world, our love can allow the blind to feel the light of life at heart.

Special broadcasting programs for the visually impaired people can be added in broadcasting stations of various regions; audio contents of the broadcasting program are to introduce various products meeting the requirements of the visually impaired people; and when the visually impaired people need (or are interested) when listening to broadcasting, the visually impaired people start the association operation key via the smart phone supporting the interactive interconnected system (namely the first method of the invention) . . . .

The visually impaired people can obtain (listen to) more relevant information contents of the products via the electronic files set by the associated data . . . or conduct a subscription procedure.

The audio information signal is stored in an electronic storage device, and read by an audio terminal product supporting the interactive interconnected system, and the electronic storage device includes an electronic data memory, a compact disc, etc.

When the invention is compared with the operation of obtaining the associated data via the QR code patterns;

1. The interactive interconnected system shall be embedded into the smart phone for support, which is the same as the QR code patterns.

2. Obtaining of the associated data is much more sensitive and accurate than capturing of the QR code patterns.

3. The associated data can be obtained without influence of light conditions.

4. The distance for obtaining the associated data may be set within a range of tens of meters as required, and the invention is very stable, while the QR code pattern technical scheme has an operationable range of about 1 m under the normal condition.

5. The figures are used for replacing the QR code patterns, which can reduce the influence on the appearance attractiveness of the advertisement boards.

The audio information signal based on importance (or having a value) employs an encrypted synthesis method, and can be decomposed by a decryption program supporting the interactive interconnected system, thus achieving a protection effect.

The media information data and the associated data use an encrypted synthesis method.

By reference to the effects of the above relevant embodiments, through the comparison between the invention and the relevant technical solutions and product schemes on the market, the invention is obviously superior to the others in use, operation, manufacturing cost and transmission effect, and the development of the invention will influence all links of a commercial chain, and create a brand-new commercial mode and value chain.

Although the invention is revealed through the above embodiments, the range of the invention is not limited to those, and the above members may be replaced by similar or identical elements realized by those skilled in the art under the condition of not deviating from the conception of the invention.

What is claimed is:

1. An audio information signal supporting an interactive interconnected system, wherein the audio information signal (01) is formed by audio data (11) and associated data (12) synthesis and is characterized in that the interactive interconnected system comprises an electronic reading device (02) and an electronic transmitter-receiver (03);

the associated data is a preset URI (Uniform Resource Identifier);

the electronic reading device is provided with a combination data reception circuit (21), a combination data decomposition circuit (22) and a transmission circuit (24); the combination data reception circuit is configured to receive the audio information signal; the combination data decomposition circuit (22) is configured to decompose the audio information signal into media information data and associated data; the decomposed associated data is transmitted to the electronic transmitter-receiver via the transmission circuit (24);

the electronic transmitter-receiver is provided with an associated data reception circuit (31), an associated data transmission circuit (32) and a central processing unit (with memory);

the associated data reception circuit (31) is equipped with a short-distance signal transmission-reception circuit; and the electronic transmitter-receiver is mainly configured to control transmit-receive of the associated data of the decomposed audio information signal, transmit the associated data to an external information data storage center via a remote wireless technology, and quickly call out an electronic file associated with an information data storage center.

2. The audio information signal supporting the interactive interconnected system of claim 1, wherein The URI (Uniform Resource Identifier) is one supporting Internet connection.

3. The audio information signal supporting the interactive interconnected system of claim 1, wherein The URI (Uniform Resource Identifier) is communication data supporting telecommunication network connection.

4. The audio information signal supporting the interactive interconnected system of claim 1, wherein the associated data is an associated data group (12X) as a combination of more than one associated data, and the different URIs (Uniform Resource Identifiers) are set for the different associated data respectively.

5. The audio information signal supporting the interactive interconnected system of claim 1, wherein the associated data sets an electronic reading code (14), the different electronic reading codes correspond to the different associated data, and the different URIs (Uniform Resource Identifiers) are set for the different associated data respectively.

6. The audio information signal supporting the interactive interconnected system of claim 4, wherein multiple replication and cyclic transmission are set for the associated data within reading time of the media information data.

7. The audio information signal supporting the interactive interconnected system of claim 4, wherein the association address data is association hybrid data (12M) capable of being mixed with content data such as characters, images, audio and video, and the association hybrid data (12M) is decomposed into the associated data by an association hybrid data decomposition circuit.

8. The audio information signal supporting the interactive interconnected system of claim 1, wherein the audio information signal is transmitted by a signal transmission station and a signal transmission transfer device.

9. The audio information signal supporting the interactive interconnected system of claim 1, wherein
the transmission circuit of the electronic reading device is equipped with the short-distance signal transmission-reception circuit;
the combination data decomposition circuit of the electronic reading device is configured to decompose the audio information signal into the audio data (11) and the associated data;
the decomposed audio data is transmitted to the related configuration for use after transmitted to an audio system for processing; and
the decomposed associated data is transmitted by the transmission circuit and the equipped short-distance signal transmission-reception circuit.

10. The audio information signal supporting the interactive interconnected system of claim 1, wherein
the audio information signal is stored in an electronic storage device, and read by an audio terminal product supporting the interactive interconnected system.

11. The audio information signal supporting the interactive interconnected system of claim 1, wherein
the media information data and the associated data use an encrypted synthesis method.

12. The audio information signal supporting the interactive interconnected system of claim 5, wherein
multiple replication and cyclic transmission are set for the associated data within reading time of the media information data.

13. The audio information signal supporting the interactive interconnected system of claim 5, wherein
the association address data is association hybrid data (12M) capable of being mixed with content data such as characters, images, audio and video, and the association hybrid data (12M) is decomposed into the associated data by an association hybrid data decomposition circuit.

* * * * *